United States Patent
Rieger et al.

(10) Patent No.: US 9,231,919 B2
(45) Date of Patent: Jan. 5, 2016

(54) METHOD AND DEVICE FOR ANONYMOUS ENCRYPTED MOBILE DATA AND SPEECH COMMUNICATION

(75) Inventors: Frank Rieger, Berlin (DE); Robbert Gonggrijp, Amsterdam (NL)

(73) Assignee: GSMK GESELLSCHAFT FUR SICHERE MOBILE KOMMUNIKATION MBH, Berlin (DE)

( * ) Notice: Subject to any disclaimer, the term of this patent is extended or adjusted under 35 U.S.C. 154(b) by 1733 days.

(21) Appl. No.: 12/174,631

(22) Filed: Jul. 17, 2008

(65) Prior Publication Data

US 2010/0002882 A1    Jan. 7, 2010

(30) Foreign Application Priority Data

Jul. 17, 2007 (DE) .......................... 10 2007 033 667

(51) Int. Cl.
  *H04L 29/06*    (2006.01)
(52) U.S. Cl.
  CPC ........ *H04L 63/0281* (2013.01); *H04L 63/0414* (2013.01); *H04L 63/18* (2013.01)
(58) Field of Classification Search
  USPC .................................. 380/270–275; 713/150
  See application file for complete search history.

(56) References Cited

U.S. PATENT DOCUMENTS

| | | | |
|---|---|---|---|
| 5,418,782 A * | 5/1995 | Wasilewski .................... | 370/486 |
| 6,580,909 B1 * | 6/2003 | Carro .......................... | 455/435.1 |
| 2001/0002212 A1 * | 5/2001 | Asano et al. .................. | 380/278 |
| 2001/0040967 A1 * | 11/2001 | Proctor ........................ | 380/283 |
| 2002/0004900 A1 * | 1/2002 | Patel ............................. | 713/155 |
| 2002/0142805 A1 * | 10/2002 | Pecen et al. .................... | 455/558 |
| 2003/0194065 A1 * | 10/2003 | Langseth et al. .............. | 379/88.18 |
| 2006/0218624 A1 * | 9/2006 | Ravikumar et al. ........... | 726/3 |
| 2006/0242404 A1 * | 10/2006 | Su ................................. | 713/150 |
| 2007/0074169 A1 * | 3/2007 | Chess et al. ................... | 717/126 |
| 2008/0049779 A1 * | 2/2008 | Hopmann et al. ............. | 370/431 |
| 2008/0080558 A1 * | 4/2008 | Wang et al. ................... | 370/474 |

OTHER PUBLICATIONS

Syverson et al: "Tor: The Second-Generation Onion Router" Proceedings of the 13th Usenix Security Symposium, [Online] Aug. 2004 (20084-08-13).
Examination Report for Canadian Application No. 2,636,780 issued on Jan. 15, 2015.

* cited by examiner

*Primary Examiner* — David Le
(74) *Attorney, Agent, or Firm* — Perkins Coie LLP

(57) ABSTRACT

The invention relates to a method for anonymizing the communication of mobile terminals which permit speech communication, using an anonymizing network which comprises a series of routers and which has at least one access node, wherein each mobile terminal establishes a connection with at least one access node, comprising the following steps:

signing the mobile terminal onto the network via an access node;
  preparation of an identity in the network;
  communication via the anonymized network, wherein the network selects different random routes through the network for communication, so that back-tracing is prevented and wherein communication is encrypted.

17 Claims, 1 Drawing Sheet

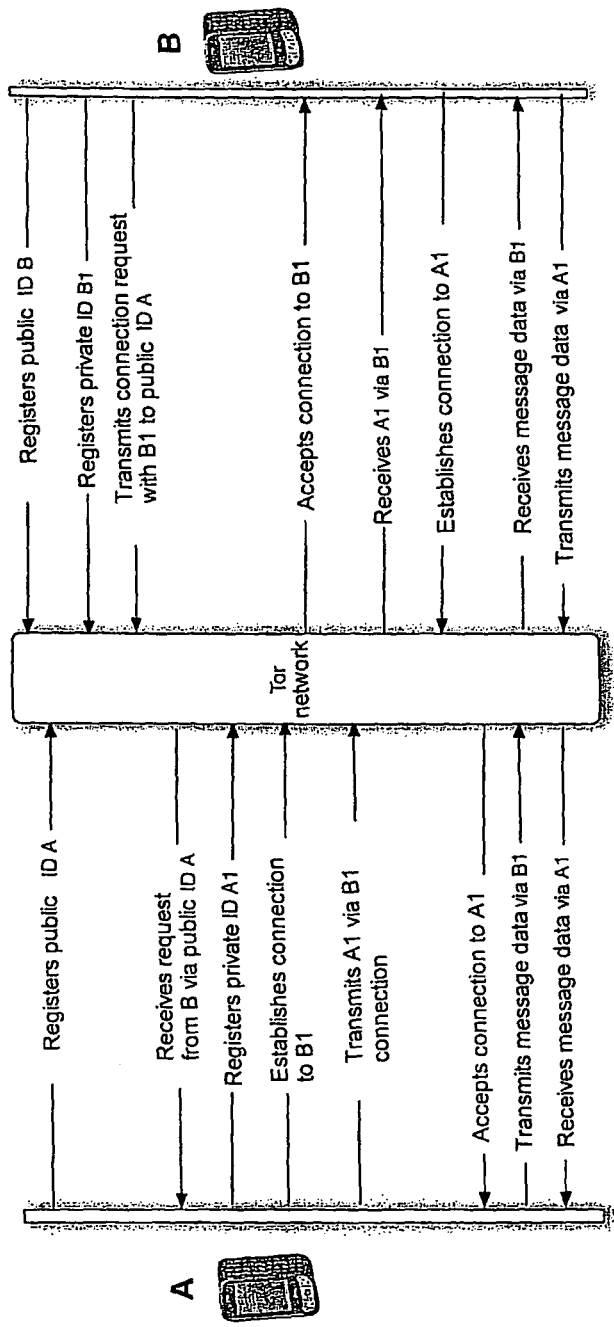

METHOD AND DEVICE FOR ANONYMOUS ENCRYPTED MOBILE DATA AND SPEECH COMMUNICATION

The invention relates to a method which enables users to exchange anonymous encrypted messages and conduct telephone conversations. The method comprises a combination of a high degree of encryption to protect the content of the conversation and an anonymising mechanism to protect the connection data of the users.

FIELD OF THE INVENTION

Mobile terminals with a high level of encryption which are able to encrypt the content of telephone conversations and brief messages (by means of the Short Message Service SMS) are known. The technology of relevance to the method is based on a secure storage as the repository for the authenticated key. The secure storage must be freed for use by the user by means of a password. The method supports a plurality of types of message transfer ('transport types') such as, for example, SMS, CSD, GPRS, etc., as well as a plurality of message types which fall within the two main types 'text' and 'media'. In general, there is a delivery possibility for a particular message type that is independent of the transport type even if, for technical reasons not all message types harmonise with all the transport types (an example would be the extremely uneconomical transfer of speech messages via the short messaging service SMS).

It is possible for encryption to take place, for example, with the cryptoalgorithms AES and Twofish (both with 256 bit key length) in CFB mode with a 256 bit shift register; the key exchange takes place with a 4096 bit Diffie Hellman mechanism with hash-based protection against 'man-in-the-middle' attacks. The method is also open to other algorithms.

A disadvantage with this approach, however, is the fact that the connection set-up can be further tested. It can therefore be discovered who has made a call, with whom and when.

OVERVIEW OF THE INVENTION

It is an object of the present invention to anonymise communication so that the identity of the parties involved cannot be discovered.

This object is achieved by a method and a device having the features of the independent claims.

The method concerning which the patent application is made essentially has, in addition to the existing encryption components, an anonymising component which makes it possible not only, as before, to encrypt the conversations themselves, but also to conceal who has communicated with whom (and if at all there was a conversation). This protection is directed primarily against 'traffic analysis' based on the 'call data record', CDR.

For this purpose, the method according to the invention makes use of an anonymising network by the name of 'Tor'. Tor is based on the principle of 'onion routing', which involves connections on the device of the user being carried out via an 'onion proxy', which selects a randomly chosen route for each connection, via the routers present in the Tor network. The last server appears herein as an 'exit node' and sends the data to the final recipient after leaving the Tor cloud. At this point, it is no longer possible for an observer constantly watching the 'exit node' to determine who the sender of the message was. This concept and its components are known from the 'Tor' project http://tor.eff.org.

The method according to the invention uses the 'Tor hidden service' in order to display the availability of a user to the parties to the conversation, via a mechanism that has been developed. A user who is online announces, by means of a method described below, a 'hidden service' which is known to the other partner. By this means, a connection is created which comprises two virtual 'hidden service' lines—one for each direction. All the data packets (containing text, speech, etc.) that are sent via these virtual 'hidden service' lines are initially encrypted independently of any channel encryption that may be present on the transport route. By this means, it is ensured that the confidentiality of the message is preserved, even if an attacker should succeed in circumventing the anonymising.

Following encryption, all messages from user A to user B are sent in a 'hidden circuit' which transports the messages through the Tor cloud and thereby obscures the communication relationship between A and B. For this purpose, the 'hidden service ID' of the other individual should be known to each user. By distinguishing between 'public' and 'private' service IDs, attacks via a cross-correlation or via 'spoofing' of the 'c/o-hosts' connected between are prevented. The service IDs for each communication partner of a user are stored with a local alias in the secure storage of the device.

The next section gives a more detailed technical description of the method for using the Tor network for encrypted anonymised communication with mobile devices.

The circuits are used so that messages can be sent from A to B in the circuit to which the user B and the user A are connected as 'hidden service' servers. B sends messages into the circuit which A has built up, to his 'hidden service' server. This is necessary since a user might have broken in or circumvented the security mechanisms such as the Tor encryption or authentication schemes, or more likely, stolen the Tor keys from a user in order to log in with the ID of another user, to obtain messages from him. Therefore, two channels are used for bidirectional communication, as is the case in speech communication.

It can therefore be prevented that successful spoofing of the 'hidden service' ID leads to a loss of messages and to desynchronisation of the 'key hash' chains. Since separate encryption is used within the Tor circuits, no message content is disclosed, even if the Tor encryption and/or the anti-spoofing techniques were to fail.

As soon as a user connects to the Tor system, the hidden services by means of which he can be reached are registered in the Tor cloud. If a client is configured in this form, the client then attempts to contact a hidden service of the user in his buddy list or contact list and updates the online status of the buddy list, if they can be reached. The hidden service circuits can then be kept live for incoming and outgoing messages and for online status updates or can be switched off following a message transmission (depending on the user configuration; see the connection profiles).

In order to be in a position to contact a user, his hidden service ID (e.g. 5xmm3d9vkn21kq90.onion) must, in general, be known. The maximum practical number of hidden service IDs that can be kept open per device must be determined. In practice, the user should possess a public 'hidden service' ID (this can be publicised on business cards or in directories), which is used to establish an internal contact. The client software then allocates a unique 'hidden service ID' to each communication partner (this prevents cross-relation or spoofing on the c/o-host, as described below). If desired, a user can also generate a unique ID manually and issue it manually to the communications partners. It should be avoided that the IDs are issued in duplicate. This approach is possible because the service IDs are generated by terminals themselves (with known algorithms) and due to their length, a collision is avoided. This service ID is made available to neighbouring routers which use the service IDs for the routing according to a special method.

The IDs of the communication partner are preferably provided with a local alias which is stored in the secure address book.

A special type of configuration is the c/o-host. This can be imagined as a type of trustworthy answering machine for Tor messages. All communications between a user and the c/o-host are carried out via a specially allocated hidden service circuit with a secret ID. The user transfers his 'hidden service' ID to the c/o-host (he must register his Tor 'hidden service' key on the server for this purpose). The c/o-host then monitors whether these IDs are online by periodic contact attempts. If they go offline, the c/o-host registers the IDs in the Tor cloud, connects the corresponding IDs of the communications partners and receives all the messages from them with the response 'stored by c/o-host' messages.

When the user goes online, he connects firstly to his c/o-host, receives the stored messages and leaves the c/o-host to deregister with his ID from the network. He then registers the IDs with his device and sends a 'received acknowledge' message for all messages he has received from the c/o-host. With this setup, the functionality of a present-day email and instant messaging system is achieved without an attackable central host and without the vulnerability attributable to traffic analysis.

The location of the c/o-host does not have to be known to all in this configuration except for the operator of the physical machine (this may be the user himself, who should at least trust the server a little). The desktop client can also comprise a c/o functionality so that it is very easy to permit a personal c/o-host to run on a desktop system. The only thing that a user must do is that he must be able to input the 'hidden service' ID of his c/o-host, which is displayed by software on his mobile device.

Since the c/o-host is also connected to the user via the Tor circuit or the cloud and it does not store the encryption keys or plain text messages, taking over the c/o-host can only lead to loss of the stored messages and enable an attacker to let an active attack run against the anonymity of the user in that he adds a timing pattern during traffic with the user. The content of the messages and the original senders of the stored messages are further secured against the attacker.

Tor circuits are currently TCP connections in the preferred embodiment. This means that a relatively high degree of reliability is assumed if the circuit has been set up. The possibility is also considered, however, of sending data via networks that are less reliable. This could be, for example, a UDP connection. It is therefore not limited solely to TCP connections.

Further, the messages should be filled up so that they fill unfragmented IP packets within a Tor circuit. Messages that are longer than one packet are distributed over a plurality of packets with connection indicators which allow a correct reconstruction. Each packet is treated as a separate message, which means that it has a handshake envelope and can be decrypted, even if other packets which belong to the same message have been lost.

A further important aim of the Tor transport layer is traffic obscuring. Preferably, the 'hidden service' traffic should appear like a normal https://-connection. This can be achieved, on the one hand, in that changes to the protocol can be made such that it can be fed back to the main Tor cloud or that the users do this themselves. Herein, speech communication or SMS/MMS communication is sent via a protocol which, based on its ports and its addressing, corresponds to a https://-connection. Since the contents of the packets is encrypted, no conclusions can be drawn about any speech communication.

There are essentially two main reasons for employing traffic obscuring, which are the avoidance of problems encountered by users and better functioning in limited network environments, as often occurs in GSM-based IP networks. It can even lead thereto that a real outer layer of http/TLS has to be added to the communication between the client and the first Tor server. Since the certificates can be laid down by the user himself, problems such as the sniffing of SSL proxies or mainstream certificates can be avoided.

The Tor client currently receives a large host table with bandwidth and uptime attributes when connecting to the network and selects at least the first host in the chain, based on the attributes. Since this concept can be used to recognise that a Tor client is present, precisely as for the de-anonymising attacks and the very high bandwidth requirement for a GPRS-based device, the client should operate in a different form. Therefore, preferably, only random subgroups of hosts are determined in a table or the tables are cached or other means for regular updating of the tables are selected. Ideally, a number of trustworthy first input hosts are formed or other means are found for providing input points so that the Tor cloud cannot easily be blocked by an operator. Thus, for example, concepts based on priorities are conceivable. An update for users can take place with a high priority if there was often communication with this one in the past. Since the Tor output nodes can become a target for more and more backdoor attacks, leading to an increasing level of misuse, a large number of output nodes needs to be present, which can be continuously inserted or removed.

Nodes which use the present Tor version should use additional anti-tracking methods, such as the random time jitter of packets that are sent through. A protocol indicator outside the encryption envelope, which would declare whether packets should be freed from any time information, could also be considered; these packets are transmitted at the cost of a higher latency time or they are cleaned less stringently and thereby have a lower latency.

BRIEF DESCRIPTION OF THE FIGURES

The following FIGURES serve to illustrate the invention. They should not be regarded as restricting the scope of protection.

FIG. 1 shows the sequence of communication between two terminals via the Tor network.

DETAILED DESCRIPTION OF A POSSIBLE EMBODIMENT

FIG. 1 shows the sequence of signing on in a preferred embodiment. Both terminal A and terminal B are reachable in the Tor network via a public ID. Terminal B wishes to establish a connection with terminal A. For this purpose, a private ID is registered (this can be created asynchronously at any time. Due to the large address domain, there is a very small probability of a collision), by means of which communication will be conducted in future. In the next step, a connection request is passed on to the public ID of A and this is passed on by the Tor network.

Following receipt of the request by A, A registers a private ID A1 and establishes a connection with B1. B accepts this connection and transmits the connection information to A via B1. B receives ID A1 via B1 and therewith creates a connection to A1. A accepts the connection to A1. Thus a communication can take place via the secret IDs A1 and B1, so that A transmits the message data via the address B1 and B transmits the message data via the address A1.

This FIGURE is intended to elucidate the invention. It is not intended to restrict the invention. The scope of protection is intended to be defined by the broadest interpretation of the attached claims.

The invention claimed is:

1. Method for anonymising communication between mobile terminals which enable speech communication, making use of an anonymising IP-based network which comprises a series of routers which has at least one access node, wherein each mobile terminal establishes a connection with at least one access node, comprising:
  signing one of the mobile terminals onto the network via an access node;
  provision of a first public identity identity for each terminal in the network being a hidden service identity according to the TOR-technology;
  communication via the anonymised network using hidden services according to the TOR-technology, wherein the network selects different random routes for the communication, so that back-tracing is hindered and the communication is encrypted;
wherein a second private identity for each terminal in the network being a second hidden service identity according to the TOR-technology is used after signed on with the first public identity for the speech communication and the speech communication takes place via two virtual lines, one for each direction, which are encrypted independently of one another and are differently routed.

2. The method according to claim 1, wherein service IDs are stored with a local alias in a secure storage of the signed-on mobile terminal for each communication partner of a user.

3. The method according to claim 2, wherein following signing-on, an online status is updated.

4. The method according to claim 3, wherein only random subgroups of hosts are determined in a table or the tables are cached or a number of trustworthy first input hosts, which cache the tables, is formed, or an update can take place for users according to priority, and the priority can be high if there has been frequent communication with them in the past.

5. The method according to claim 1, wherein nodes of the anonymised network perform random time jittering of packets or packets can be freed from any time information.

6. The method according to claim 1, further comprising using an answering machine for speech and text messages.

7. The method according to claim 6, wherein 'hidden service' IDs are placed on the trustworthy answering machine, wherein the trustworthy answering machine checks whether these IDs are online and whether these IDs go offline, the trustworthy answering machine registers the IDs in a Tor cloud itself and connects the corresponding IDs of the communication partners and receives all messages from them, with the response 'stored by trustworthy answering machine' message.

8. The method according to claim 7, wherein the signed-on mobile terminal goes online, initially connects to its trustworthy answering machine, receives the stored messages and leaves the trustworthy answering machine in order to deregister itself with its ID from the network, then the mobile terminal registers the IDs with its device and then sends a 'received acknowledge' message for all messages it has received from the c/o-host.

9. The method according to claim 1, wherein the messages are also filled up so that unfragmented IP packets are filled up, wherein messages which are longer than one packet are distributed among a plurality of packets, with connection indicators which permit correct reassembly.

10. The method according to claim 1, wherein the traffic is obscured in that the speech communication appears like a typical https://-connection.

11. Mobile terminal for anonymising a speech communication, comprising:
  a processor configured to
    permit speech communication
    sign on the mobile terminal on an anonymised IP-based network via an access node;
    provide a first public identity for each terminal in the anonymising network being a hidden service identity according to the TOR-technology;
    communicate speech via the anonymising network using hidden services according to the TOR-technology, wherein the network selects different random routes through the network for the communication, so that back-tracing is hindered and wherein the communication is encrypted,
wherein a second private identity for each terminal in the network being a second hidden service identity according to the TOR-technology is used after signed on with the first public identity for the speech communication and the speech communication is carried out via two virtual lines, one for each direction, which are encrypted independently of one another and are differently routed.

12. The mobile terminal according to claim 11, further comprising a secure storage and wherein the processor is further configured to store the service IDs for each communication partner of a user with a local alias in the secure storage.

13. The mobile terminal according to claim 12, wherein the processor is further configured to, following signing-on, update an online status of the user in the secure storage.

14. The mobile terminal according claim 13, wherein the processor is further configured to determine only random subgroups of hosts in a table or a database of the users to cache or to form a number of first trustworthy input hosts which cache the tables and from which said tables are fetched, or to update users according to priority, and the priority can be high if there has been frequent communication with said users in the past.

15. The mobile terminal according to claim 11, wherein the messages are also filled up so that unfragmented IP packets are filled up, wherein the processor is further configured to distribute messages, that are longer than one packet, over a plurality of packets with connection indicators which allow a correct reconstruction.

16. The mobile terminal according to claim 11, wherein the processor is further configured to obscure the traffic in that speech communication appears like a normal https://-connection.

17. The mobile terminal according to claim 16, wherein the anonymised network is the Tor network.

* * * * *